US012714890B2

(12) United States Patent
Gamberini et al.

(10) Patent No.: US 12,714,890 B2
(45) Date of Patent: Aug. 25, 2026

(54) FULL FACE MASK EQUIPPED WITH AN INLET AIR FILTER

(71) Applicant: MESTEL SAFETY S.R.L., Sant'Olcese (IT)

(72) Inventors: Sergio Gamberini, Genoa (IT); Gabriele Cucchia, Genoa (IT)

(73) Assignee: MESTEL SAFETY S.R.L., Sant'Olcese (IT)

( * ) Notice: Subject to any disclaimer, the term of this patent is extended or adjusted under 35 U.S.C. 154(b) by 715 days.

(21) Appl. No.: 17/201,432

(22) Filed: Mar. 15, 2021

(65) Prior Publication Data

US 2021/0283431 A1 Sep. 16, 2021

(30) Foreign Application Priority Data

Mar. 16, 2020 (IT) ........................ 102020000005569

(51) Int. Cl.

| | |
|---|---|
| ***A62B 18/04*** | (2006.01) |
| ***A62B 7/10*** | (2006.01) |
| ***A62B 7/12*** | (2006.01) |
| ***A62B 9/02*** | (2006.01) |
| ***A62B 18/08*** | (2006.01) |

(Continued)

(52) U.S. Cl.

CPC ................ *A62B 18/04* (2013.01); *A62B 7/12* (2013.01); *A62B 18/084* (2013.01); *A62B 18/10* (2013.01)

(58) Field of Classification Search

CPC .... A62B 7/04; A62B 7/10; A62B 7/12; A62B 9/02; A62B 18/00; A62B 18/02; A62B 18/025; A62B 18/10; A62B 23/02; A62B 27/00; A62B 18/04; A62B 18/045; A41D 13/1184; B63C 11/12; B63C 11/16; A42B 3/28; A42B 3/281

See application file for complete search history.

(56) References Cited

U.S. PATENT DOCUMENTS

| | | | | |
|---|---|---|---|---|
| 2,671,445 A * | 3/1954 | Charbonnel ........... | A62B 18/00 128/201.12 |
| 3,680,555 A * | 8/1972 | Warncke ................ | A62B 18/10 128/206.28 |
| 2006/0060193 A1* | 3/2006 | Richardson ............ | A62B 18/08 128/201.22 |

FOREIGN PATENT DOCUMENTS

| | | |
|---|---|---|
| CN | 104190015 A | 8/2016 |
| EP | 2913083 A1 | 9/2015 |
| EP | 3153400 A1 | 4/2017 |

(Continued)

OTHER PUBLICATIONS

Jeremy Yuen Cars "homemade DIY coronavirus covid-19 face mask", Mar. 14, 2020, pp. 1-4, XP054981125, URL:https://www.youtube.com/watch?v=UWqHdvRCuQg.

(Continued)

*Primary Examiner* — Camtu T Nguyen

(74) *Attorney, Agent, or Firm* — CANTOR COLBURN LLP

(57) ABSTRACT

A full face mask equipped with an inlet air filter includes a transparent visor, a frame or strap, preferably a rubber gasket designed to guarantee water tightness and appropriate straps to fit the mask on the face. The mask has a fitting which engages on the upper part of the mask in an inspiration mouth and which allows the flow of air to enter the space created between the frame and the viewer. This fitting includes a coupling portion to this mouth and on the opposite side a seat for the attachment of a filtering system of the air entering the mask.

5 Claims, 2 Drawing Sheets

(51) Int. Cl.
*A62B 18/10* (2006.01)
*A62B 23/02* (2006.01)

(56) References Cited

FOREIGN PATENT DOCUMENTS

| | | | | |
|---|---|---|---|---|
| GB | 2 032 284 | A | * | 9/1979 |
| KR | 200490349 | Y1 | | 10/2019 |
| WO | 2012003133 | A1 | | 1/2012 |

OTHER PUBLICATIONS

Thingiverse.Com "3M Filter Adapter for Snorkel Mask (dual or single filter) by cimac—Thingiverse", Mar. 15, 2020, pp. 1-6, XP055756554, URL:https://www.thingiverse.com/thing:4222994.
Thingiverse.Com "Full Face Protective Mask Decathlong EasyBreath adapter for 3M Cardidges by R3DPhoto—Thingiverse", Nov. 17, 2019,pp. 1-5, XP055756659, URL:https://www.thingiverse.com/thing:3981307.
Thingiverse.Com: "Thing files for adaptateur easybreath gas mask adapter [Apr. 10, 2020] by realcharal—Thingiverse", Jan. 19, 2019, pp. 1-3, XP055756550, URL:https://www.thingiverse.com/thing:3366933/files.

* cited by examiner

Fig. 1
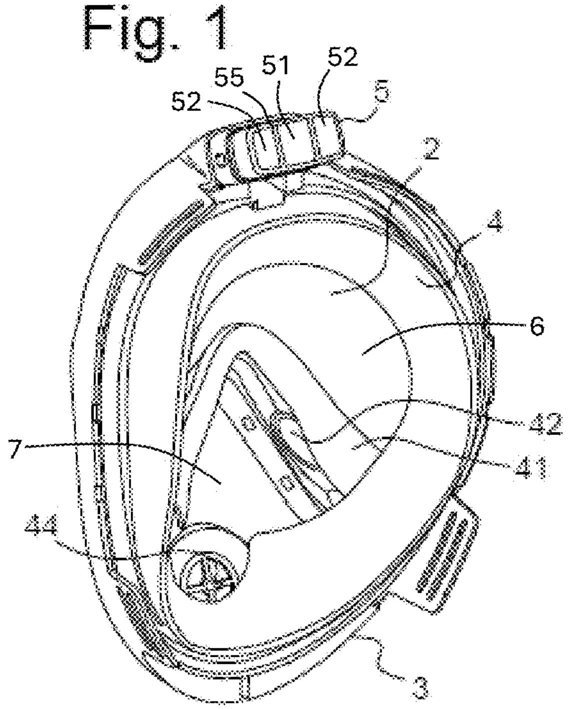
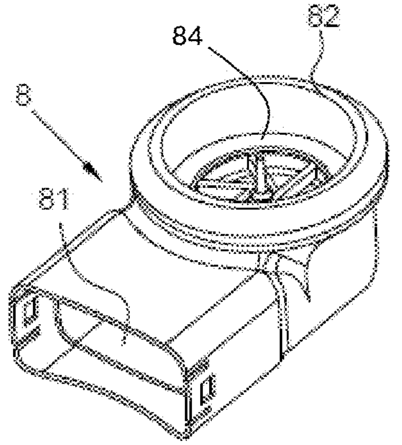
Fig. 5
Fig. 2
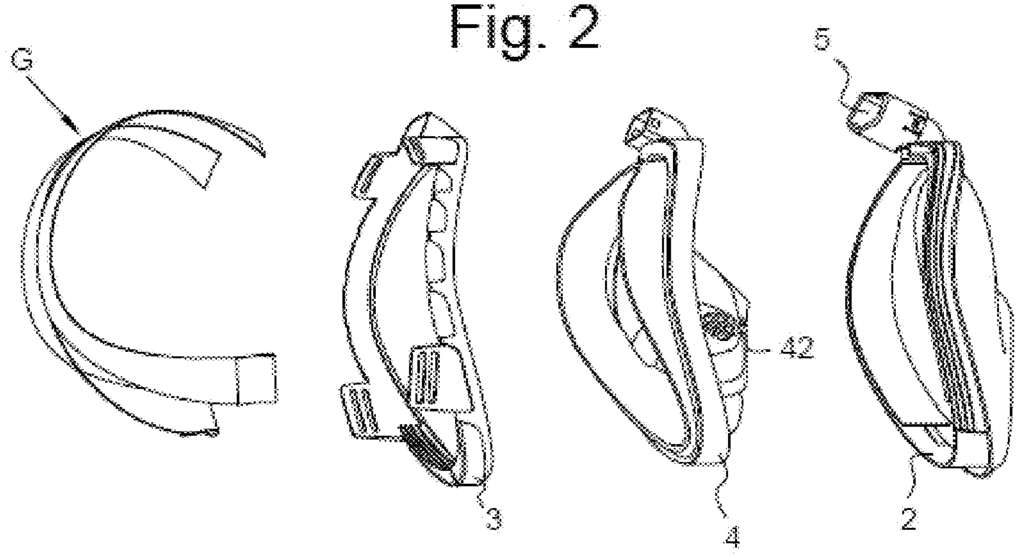

FULL FACE MASK EQUIPPED WITH AN INLET AIR FILTER

CROSS REFERENCE TO RELATED APPLICATIONS

This application is related to and claims the benefit of European Patent Application No. 102020000005569, filed on Mar. 16, 2020, the contents of which are herein incorporated by reference in their entirety.

TECHNICAL FIELD

The present disclosure relates to a full face mask equipped with an inlet air filter.

BACKGROUND

In diving, a mask called full face covering the entire face, including the mouth, has been introduced on the market for some years. This second type of mask comprises a transparent visor, a frame or strap, a rubber gasket designed to guarantee water tightness and appropriate straps to fit the mask onto the face. A breathing mouthpiece which fits onto the upper part of the frame and which allows the flow of air to enter the space formed between the frame and the viewer is associated with this facial part of the mask.

The path of the air in the inspiration phase and the one in the exhalation phase are advantageously different from each other.

For this purpose, inside the mask there are in fact two spaces, one main upper one in the area of the user's eyes and cheekbones and one oronasal which is associated with the user's nose and mouth. These compartments are separated by a separation wall equipped with air valves.

The fresh inhaled air arrives through the tube in the main compartment of the mask, laps the transparent part or visor, crosses the wall by means of the aforementioned valves and reaches the oronasal compartment to be breathed.

The air exhaled from the mouth or nose does not come out of the oronasal compartment, because the valves on the separation wall prevent it, but reaches the tube through a perimeter exhalation duct of the mask.

The tube itself is made with separate ducts for the inspiration and exhalation air equipped with suitable directional valves.

A mask of this type is described in patent application EP3153400 in the name of the same Applicant.

SUMMARY

The Applicant has perceived that this full face mask structure, due to the fact that it does not allow the user to breathe the air outside the mask without a forced channeling, can be modified in order to realise an air filtering mask, usable in environments in which the external air must be filtered, for example due to the presence of viruses or other pathogens.

In order to be able to associate a filter to the mask, proportionate to the type of pathogen to be filtered, the Applicant has made an adapter which is inserted on the top of the mask in the housing which normally accommodates the breathing tube in water and which is capable of associating the mask with the filter.

These and other purposes according to the present disclosure are achieved by realising an air filtering full face mask as set forth in claim 1.

Further features of the mask are the subject matter of the dependent claims.

BRIEF DESCRIPTION OF THE DRAWINGS

The features and advantages of a diving mask according to the present disclosure will be more apparent from the following description, which is to be understood as exemplifying and not limiting, with reference to the schematic attached drawings, wherein:

FIG. 1 is a perspective view of the mask according to the present disclosure without the fitting for a filter and closure straps;

FIG. 2 is an exploded perspective view of the mask without the fitting for a filter according to the present disclosure;

FIG. 5 illustrates a perspective view of the fitting according to the present disclosure.

DETAILED DESCRIPTION OF THE DRAWINGS

Figure 3:
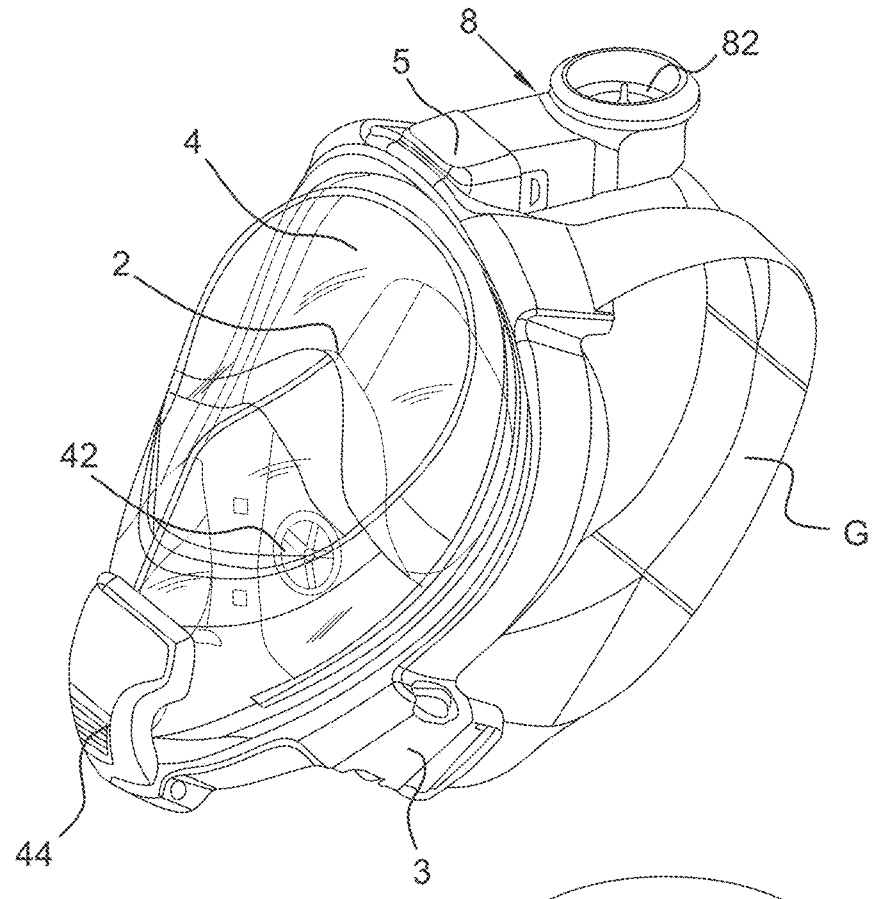
FIG. 3 illustrates a perspective view of the mask equipped with fitting for the filter according to the present disclosure.
Figure 4:
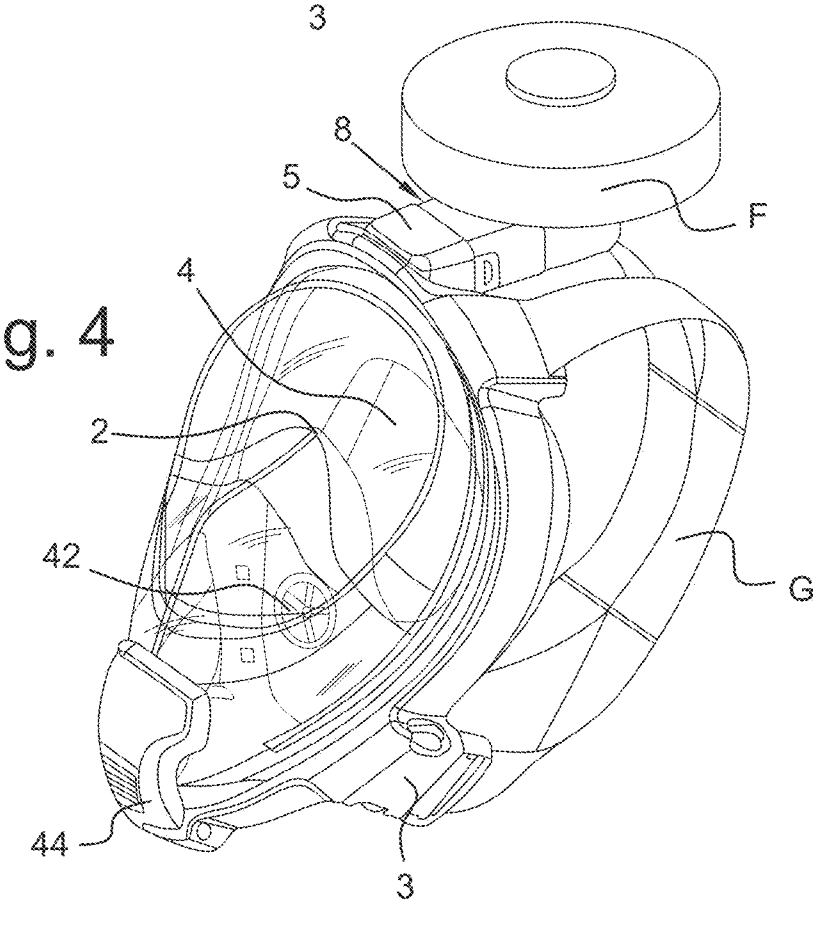
FIG. 4 illustrates a perspective view of the mask complete with filter according to the present disclosure.

With reference to the aforementioned figures, a mask of the so-called full face type is shown which comprises a transparent visor 2, a frame or strap 3, a preferably rubber gasket designed to guarantee water tightness 4 and appropriate straps G to fit the mask on the face.

The path of the air during the inspiration phase of the mask takes place through an inspiration mouth 5 located in a position above the mask.

This suction mouth comprises inspiration ducts arranged parallel to each other, one 51 is placed in a central position and the other two 52 are two placed on the sides of the central one. This mouth can have an opening upwards or in a reclined position backwards with respect to the head of the user wearing the mask.

Substantially check valves (not shown) are placed on the top of these ducts and which allow the passage of air only in the desired direction of inspiration.

In order to create differentiated paths, inside the mask there are in fact two spaces, one main upper one 6 in the area of the user's eyes and cheekbones and one oronasal 7 which is associated with the user's nose and mouth.

These compartments are separated by a separation wall 41, made in association with the gasket and provided with at least one housing for at least one check valve 55 for the passage of air from the main compartment above the oronasal one. Advantageously, the valves are two placed laterally in a symmetrical position with respect to a vertical centerline which crosses the mask.

On said centerline in a lower portion of the oronasal compartment there is a valve 42 for exhalation and therefore for the escape of air from said compartment and from the mask in general.

The inhaled air arrives through the upper mouth in the upper main compartment 6 of the mask, laps the transparent or visor part, crosses the wall by means of the aforementioned valves and reaches the lower oronasal compartment 7 to be breathed.

The air exhaled from the mouth or from the nose does not come out of the oronasal compartment, because the valves on the separation wall prevent it, but flows out through the aforementioned valve 42.

According to the present disclosure, a fitting 8 is placed on the suction mouth 5 located in the upper position of the mask, adapted to connect the aforementioned inspiration mouth to a filtering system or filter F adapted to filter the air during the suction phase inside the mask.

This fitting comprises a coupling portion 81 to the upper mouth of the full face mask and on the opposite side a seat 82 for the attachment of a filter of the normal type in use, such as for example a medical-type filter.

The type of attachment can, for example, comply with standards 148-1, 148-2, 148-3, but is not limited to these standards. It can also be extended to dedicated bayonet systems.

For example, this seat normally has a thread in which the filter is screwed.

Furthermore, inside this seat there is a non-return valve 84 designed to prevent the escape of air from that seat.

The filter is screwed on the upper part of the connector and is sealed thanks to a flat gasket as occurs in all gas masks.

In the inspiratory phase, the air passes through the filter, is "filtered" after which it enters the ducts 51 and 52 of the mask.

In normal diving use of the mask, the lateral connectors 52 are those intended for exhalation. In this case, all three channelings 51 and 52 function as inspiration and therefore keep the inspiratory effort low.

From the lateral channels the air enters directly into the oronasal. From the central duct it cools the upper part of the visor and avoids fogging of the visor itself, after which, passing through the oronasal valves 42, it enters the same and is inhaled.

During the exhalation phase, the air exits from an exhalation valve or exhaust valve 44 present in the lower part of the mask. It cannot return to the filter because on the one hand it is blocked by the oronasal valves 42 and on the other because there is the non-return valve 84 in the upper part of the fitting 8.

The position of the filter above the user's head allows the user to have a better visibility around him and also allows him to move his neck and head with greater freedom compared to other traditional gas masks, where the filter is usually positioned underneath the chin or on the sides of the chin itself, but in any case in an awkward position for neck movements.

The invention claimed is:

1. A full face mask equipped with an inlet air filter comprising a transparent visor adjacent a frame to create a space for the flow of air, a rubber gasket adapted to provide water tightness and straps adapted to fit the full face mask on a face, the full face mask further comprises a fitting which engages on an upper part of the full face mask in an inspiration mouth and which allows the flow of air to enter the space created between the frame and a user, the fitting comprising a coupling portion adapted to engage in the inspiration mouth and on the opposite side a seat for an attachment of the inlet air filter of the air entering the full face mask in which two compartments are obtained including a main compartment and an oronasal compartment, the main compartment, adapted to be disposed in the area of the user's eyes and cheekbones and the oronasal compartment adapted to be associated with the user's nose and the user's mouth, the main compartment and the oronasal compartment being separated by a separation wall, provided with at least one check valve configure for the passage of air in a direction of inspiration, wherein on a centerline in a lower portion of the oronasal compartment there is an exhalation valve for exhalation and configured for the escape of air from said oronasal compartment and from the full face mask, in which, inside the seat of the fitting there is a non-return valve designed to prevent the escape of air to the outside of the full face mask from the seat, in a way to during exhalation the air comes out from the exhalation valve for present in a lower part of the full face mask and cannot return to the inlet air filter because the air is blocked by the at least one check valve and the non-return valve at the top of the fitting.

2. The full face mask according to claim 1, wherein the inlet air filter is a medical filter.

3. The full face mask according to claim 1, wherein said seat has a thread in which the inlet air filter is screwed.

4. The full face mask according to claim 1, wherein two of the non-return valve, the exhalation valve, and the at least one check valve are placed laterally in a symmetrical position with respect to a vertical centerline which crosses the full face mask.

5. The full face mask according to claim 1, wherein said inspiration mouth comprises inspiration ducts arranged parallel to each other, one of the inspiration ducts is placed in a central position and the other two of the inspiration ducts are placed on the sides of the central one.

* * * * *